US006836710B2

(12) United States Patent
Yamaki

(10) Patent No.: US 6,836,710 B2
(45) Date of Patent: Dec. 28, 2004

(54) VEHICLE MANAGEMENT SYSTEM

(75) Inventor: Masahito Yamaki, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/131,046

(22) Filed: Apr. 25, 2002

(65) Prior Publication Data

US 2002/0161496 A1 Oct. 31, 2002

(30) Foreign Application Priority Data

Apr. 26, 2001 (JP) ....................................... 2001-130053

(51) Int. Cl.[7] ......................... G06F 19/00; G01M 15/00

(52) U.S. Cl. ............................................ 701/33; 701/29

(58) Field of Search .............................. 701/29, 30, 33, 701/35, 36

(56) References Cited

U.S. PATENT DOCUMENTS 5,442,553 A * 8/1995 Parrillo ........................ 455/420
5,781,871 A * 7/1998 Mezger et al. .............. 455/424
6,141,610 A * 10/2000 Rothert et al. ................ 701/35
6,263,265 B1 * 7/2001 Fera ............................ 701/19
6,263,322 B1 * 7/2001 Kirkevold et al. .......... 705/400
6,356,823 B1 * 3/2002 Iannotti et al. ............... 701/35
6,362,730 B2 * 3/2002 Razavi et al. ............... 340/438
6,405,111 B2 * 6/2002 Rogers et al. ................ 701/33
6,484,095 B2 * 11/2002 Wong et al. ................ 701/213
6,487,717 B1 * 11/2002 Brunemann et al. ........ 717/173
6,505,106 B1 * 1/2003 Lawrence et al. ............ 701/35
2002/0133273 A1 * 9/2002 Lowrey et al. ............... 701/29

FOREIGN PATENT DOCUMENTS

JP 7-15427 2/1995

* cited by examiner

*Primary Examiner*—Michael J. Zanelli
(74) *Attorney, Agent, or Firm*—McGinn & Gibb, PLLC

(57) ABSTRACT

In a vehicle management system of the present invention, a preparing unit prepares frequency distribution data based on travel information, a transmitting unit transmits the travel information and the frequency distribution data to an external database, and a distributing unit analyzes travel conditions of the vehicle based on data accumulated in the database and distributes an analyzed result to allow the cause of a malfunction of a vehicle to be investigated based upon real-time data collected during operation of the vehicle.

14 Claims, 6 Drawing Sheets

VEHICLE MANAGEMENT SYSTEM

BACKGROUND OF THE INVENTION

1. Field of the Invention

The present invention relates to a vehicle management system capable of managing health conditions of individual user vehicles. More particularly, the present invention relates to a vehicle management system for confirming a travel condition of each user vehicle and pursuing the cause of a malfunction and trouble in the vehicle with ease.

2. Description of the Related Art

A control system of a vehicle, such as an automobile, is constructed as a complicated electronic control system, and when there occurs an abnormal state, high levels of expertise in knowledge and judgment are required to pursue the cause of the abnormality. Therefore, it has been recently proposed to provide the self-diagnosing function for trouble diagnosis in an on-board electronic control unit. When any abnormal state is detected by on-board diagnosis based on the self-diagnosing function, an alarm lamp or the like is lit up to issue an alarm to a driver, thereby prompting the driver to take check and repair of the vehicle in, e.g., a dealer's service factory. In the service factory, an external device, e.g., a trouble diagnosing device, is connected to the on-board electronic control unit for reading internal data, such as trouble location data and trouble data, from the on-board electronic control unit. Check and repair are then performed based on the read data.

One example of such a trouble diagnosing device is disclosed in Japanese Examined Patent Application Publication No. 7-15427 filed by the assignee of this application. The disclosed trouble diagnosing device is able to read data in an on-board electronic control unit, i.e., detection signals of various sensors and switches, control signals outputted to various actuators such as injectors, within-system computation data, etc. which are stored in the on-board electronic control unit, by utilizing a body of the trouble diagnosing device or connecting a computer for an external expert system to the body of the trouble diagnosing device. As a result, it is possible to pursue the trouble location or the cause of trouble and to perform necessary repair or adjustment.

However, malfunctions or troubles of vehicles sometimes occur depending on a travel condition of each vehicle. For example, when a vehicle is repeatedly subjected to a travel condition in which the vehicle runs just a short distance in most cases such that it starts running immediately after starting of an engine and the engine operation is stopped before reaching sufficient warm-up of the engine, there may occur carbon fouling of spark plugs, oil dilution, etc., thus resulting in an engine malfunction. Such a trouble caused depending on the vehicle travel condition is detected with the self-diagnosing function only after the trouble has occurred in fact. Even in the occurrence of an actual trouble, pursuit of the trouble location is just possible to achieve and a difficulty arises in pursuit of the true cause leading to the trouble.

SUMMARY OF THE INVENTION

Accordingly, it is an object of the present invention to provide a vehicle management system capable of confirming travel conditions of individual user vehicles and pursuing the cause of a malfunction and trouble in each vehicle with ease.

A vehicle management system according to the present invention is featured in statistically processing travel information of individual vehicles in respective on-board control units and transmitting the processed information to an external database, and analyzing travel conditions of the individual vehicles based on data accumulated in the database, and distributing an analyzed result to at least one of a relevant user of each vehicle and a department having an access right to the database.

With those features, travel information of individual vehicles is statistically processed in respective on-board control units and transmitted to an external database, and travel conditions of the individual vehicles are analyzed based on data accumulated in the database. Then, an analyzed result is distributed to at least one of a relevant user of each vehicle and a department having an access right to the database. Therefore, when there occurs a malfunction or trouble in any vehicle, the cause of the malfunction or trouble can be pursued with ease, and an advice on the optimum driving method can be given to the user. Also, feeding the analyzed result back to the relevant department contributes to developing optimum control specifications and improving system reliability.

The above and other objects, features and advantages of the invention will become more clearly understood from the following description referring to the accompanying drawings.

DESCRIPTION OF THE PREFERRED EMBODIMENTS

Figure 1:
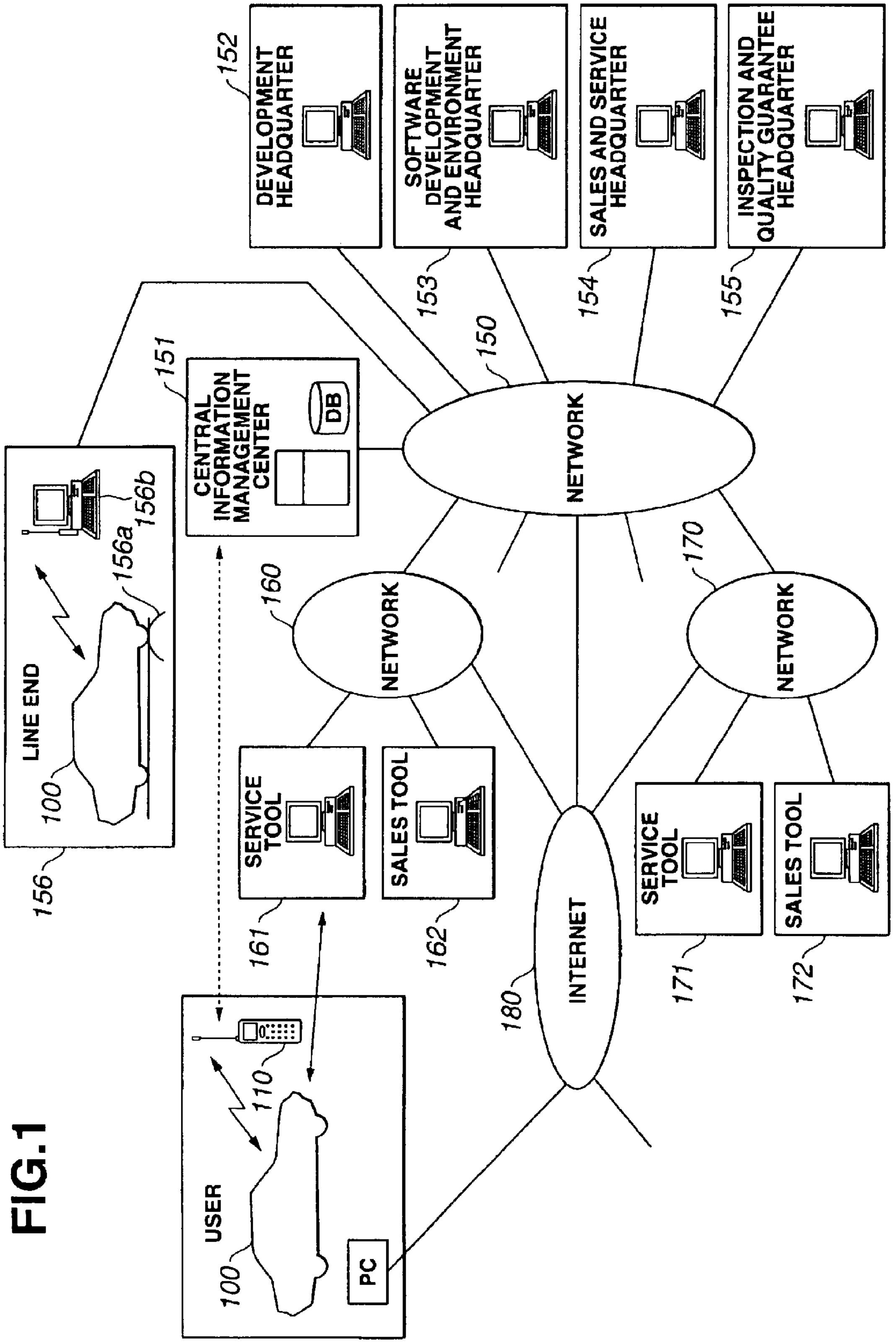
FIG. 1 is a block diagram of an overall configuration of a vehicle management system.

FIG. 1 shows a vehicle management system for accumulating and managing initial values of vehicle control information in the factory production line, managing vehicle health conditions of individual vehicles after being marketed and purchased by users in real time for 24 hours, and providing each user with the latest information (health condition) of his or her vehicle.

In the vehicle management system, each vehicle 100 marketed and purchased by a user includes a wireless (radio) communication terminal 110 as a data communication means that is able to wirelessly communicate data, such as control data for an on-board electronic control unit and data regarding travel of the vehicle (i.e., vehicle information), the latter being sampled with user's approval, to the exterior in real time. The vehicle information transmitted via the wireless communication terminal 110 is accumulated and managed as a database DB in a host computer 151*a* that is installed in a central information management center 151.

A mobile wireless communication system via a base station (not shown) or a satellite communication system via an artificial satellite (not shown), for example, can be utilized for data communication between the vehicle 100 and the central information management center 151. Also, the wireless communication terminal 110 for transmitting the vehicle information of the vehicle 100 may be constituted as a communication terminal connected to the control unit of the vehicle 100 through a harness. However, the wireless communication terminal 110 is preferably constituted using a small-sized communication terminal that is separated in the portable form from the vehicle 100 and is employed to perform wireless communication between itself and the on-board control unit. This embodiment employs, as such a portable communication terminal, a dedicated portable telephone (cellular phone) with a built-in communication circuit for wireless communication between the phone and the on-board control unit. Hence, the wireless communication terminal 110 will be described as the cellular phone 110 hereinafter. Note that, when the user has a cellular phone, the communication terminal may be one connectable to the user's cellular phone for data communication.

Figure 2:
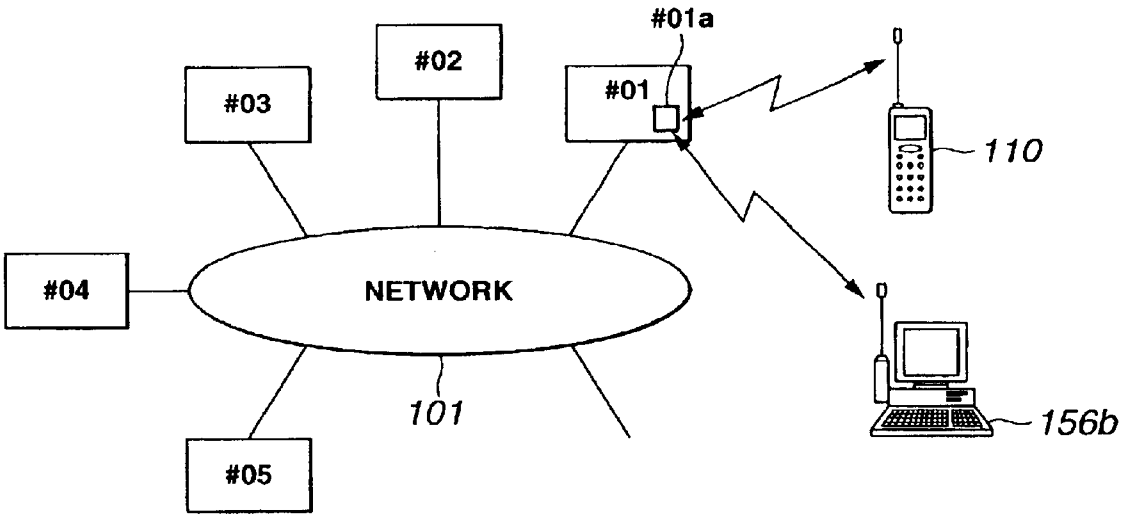
FIG. 2 is a diagram for explaining a vehicle network system.

In this embodiment, therefore, when a single control unit is installed in the vehicle 100, a communication circuit for controlling wireless communication is incorporated in that control unit. Also, when a plurality of control units are installed in the vehicle 100, for example, when a plurality of control units #n (n=01, 02, 03, 04, 05, . . . ) are installed as shown in FIG. 2, the control units #01, #02, #03, #04, #05, . . . are preferably interconnected via a network 101 so that individual pieces of control information are unified. Then, a communication circuit #01*a* for controlling wireless communication is incorporated in a predetermined one, e.g., the control unit #01, of the plurality of control units connected to the network 101. Additionally, the network 101 is a vehicular network adapted for real time control. Also, wireless communication between the communication circuit and the on-board control unit can be realized using, e.g., a communication system in conformity with Bluetooth standards for implementing short-distance wireless communication and any other suitable standards.

The communication circuit #01*a* provided in the control unit of the vehicle 100 makes it possible to perform not only wireless communication between itself and the user's dedicated cellular phone 110, but also wireless communication between itself and an inspection tool provided in the factory production line at a line end thereof or a service tool provided in, e.g., a dealer's service factory. Further, each of the control units #01, #02, #03, #04, #05, . . . installed in the vehicle 100 includes firmware capable of rewriting control programs and various constant terms (such as various learned values and control constants) which are held in the control unit even in the power-off state, in response to commands from the inspection tool provided at the line end or another external device.

On the other hand, as shown in FIG. 1, the central information management center 151 is connected, via a dedicated network 150, to a plurality of departments, such as a development headquarter 152, a software development and environment headquarter 153, a sales and service headquarter 154, and an inspection and quality guarantee headquarter 155, as well as to an inspection tool 156*b* for inspecting the vehicle 100 on a chassis dynamometer 156*a* installed in the factory production line at a line end 156 thereof. The inspection tool 156*b* includes a communication adapter for wireless communication with the communication circuit #01*a* provided in the control unit of the vehicle 100. Also, networks 160, 170, . . . dedicated for, e.g., dealers in various districts are connected to the dedicated network 150. Further, service tools 161, 171, . . . , sales tools 162, 172, . . . , and so on are connected to the corresponding networks 160, 170, . . . , respectively. Thus, the data management system is formed which enables actual diagnosis and repair of the vehicle 100 to be performed based on the management information collected in the central information management center 151. In addition, the dedicated networks 150, 160, 170, . . . are connected to the Internet 180, as a network open to the general public, so that information can be provided via a personal computer PC of each user in addition to the cellular phone 110.

In the data management system having the configuration described above, initial values of control information (i.e., initial information) of each vehicle are collected using the inspection tool 156*b* at the line end 156 of the factory production line. The vehicle is then put into the market after analyzing accumulated initial information of the vehicle to obtain optimum learned values, optimum control constants, etc., and setting the obtained data in the control unit of the vehicle. After the vehicle has been put into the market, vehicle information obtained through user access is also accumulated in addition to the initial information. When the user vehicle 100 is in an operating state, each user is able to transmit the vehicle information to the central information management center 151 in a wireless manner at any time regardless of whether the vehicle is stopped or running.

More specifically, when each user wants to know the condition of his or her vehicle 100, the user can receive information regarding the vehicle health condition, such as the condition of maintenance and the presence or absence of any trouble in the vehicle, by transmitting the vehicle information to the central information management center 151 using the cellular phone 110 dedicated for the vehicle 100. In particular, since data can be transmitted from the running vehicle in real time via wireless communication, it is possible to promptly pursue the cause and take an action even against, e.g., an abnormality appearing only in the running state and a malfunction of the vehicle appearing with very small reproducibility, which have been difficult to realize the prompt pursuit of the cause in the past.

For transmitting the vehicle information of the user vehicle 100 to the central information management center 151, the user is only required to employ the cellular phone 110 dedicated for the vehicle 100 and to depress buttons of the cellular phone 110 to enter a preset particular number. The entry of the preset particular number automatically brings wireless communication between the control unit #01 of the vehicle 100 and the central information management center 151 into a standby state, and then sets a call to the central information management center 151. Then, upon establishment of connection between the cellular phone 110 and the central information management center 151, data from the individual control units collected via the network 101 in the vehicle 100 is transmitted from the communication circuit #01*a* of the control unit #01 to the cellular phone 110 after being added with the vehicle body number, and is further transmitted to the central information management center 151 through the cellular phone 110 after being added with the user identification code, etc.

The initial information of each vehicle and the information of the vehicle after being marketed (i.e., the vehicle information for each user), both accumulated in the database DB of the central information management center 151, are distributed via the network 150 to each of the related departments, which are given with an access right to the database DB, so that the vehicle health condition is managed and various services are provided. Specifically, various management processes, such as collection of frequency-ofusage information of respective parts in the user vehicle, evaluation of control algorithms, real-time diagnosis and action to a trouble, predictive diagnosis based on confirmation of time-dependent changes in the parts and changes in the learned values, diagnosis of a trouble that is difficult to reproduce, and analysis of the travel condition of the user vehicle, are performed in the relevant departments, whereas improvements of the control algorithms, collection of information for novel development, etc. are performed in the other relevant departments.

Further, as a part of user services, the relevant department performs pre-diagnosis of the user vehicle 100 before it is sent to a service factory, notifies each user of the time limit in sending the vehicle to the service factory for, e.g., routine inspection, and distributes the information to the dealer or the like for instruction of check or diagnosis using the service tool 161 (171). Moreover, the relevant department advises the optimum driving based on the analyzed result of the travel condition of the user vehicle, and provides service of rewriting a control program of the control unit #n into specifications in match with the usage condition of the vehicle specific to each user, thereby presenting running environments desired for the user. In addition, the relevant department performs absolute quality evaluation at a part level of the vehicle after being marketed, real-time collection of live statistic data, relative quality evaluation for each parts maker, etc., and feeds the evaluation results back to the corresponding departments.

The information, such as the data analysis results and the diagnosis results obtained for each user vehicle, is accumulated in the central information management center 151 in a time-serial manner as history information for each user. The accumulated information is provided to individual users via the home page on the Internet 180 or via the cellular phone 110 directly. Stated otherwise, each user can read the information of the user vehicle by making access to the corresponding home page via the Internet 180 from the personal computer PC or making direct access to the central information management center 151 from the cellular phone 110, and then inputting his or her identification number, name, password, etc. that are registered in advance. As an alternative, the formally registered user may access a host computer 151*a* of the central information management center 151 via the personal computer PC. In that case, however, access to the host computer 151*a* from the users is restricted in consideration of security such that the user is allowed to access general information such as the diagnosis results of the user vehicle.

Management of vehicle travel information according to the present invention will be described below in connection with the management of the vehicle 100 by using the above-described vehicle management system. The following description is made of first an engine system installed in the vehicle 100, and then an electronic control system for controlling the engine system, information processing in an engine control unit, and information processing in the central information management center 151 successively.

Figure 3:
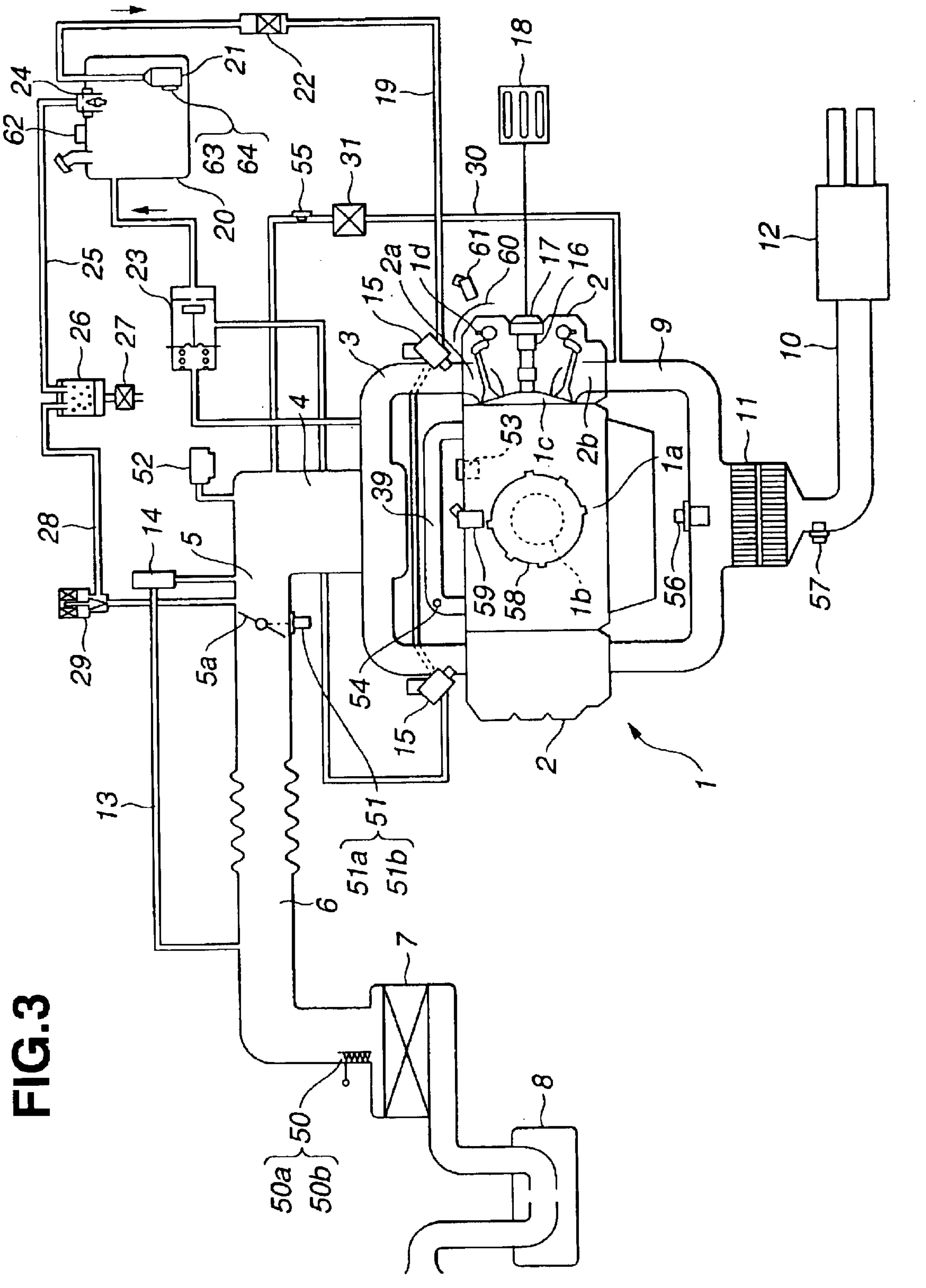
FIG. 3 is an overall schematic view of an engine system.

In the construction of the engine system of the vehicle 100, as shown in FIG. 3, an engine 1 mounted in the vehicle 100 is constituted as a horizontal opposed 4-cylinder engine in this embodiment, in which a cylinder block 1*a* is divided into two banks (left bank and right bank appearing respectively on the right side and the left side as viewed in FIG. 3) on both sides of a crankshaft 1*b* at the center. Cylinder heads 2 are provided on the left and right banks of the cylinder block 1*a* of the engine 1, and an intake port 2*a* and an exhaust port 2*b* are formed in each of the cylinder heads 2.

An intake manifold 3 is communicated with the intake port 2*a,* and a throttle chamber 5 is communicated with the intake manifold 3 through an air chamber 4 to which intake passages of respective cylinders are collectively connected. An air cleaner 7 is disposed upstream of the throttle chamber 5 with an intake pipe 6 extended between them, and is communicated with an air intake chamber 8. Also, an exhaust manifold 9 is communicated with the exhaust port 2*b.* The exhaust manifold 9 from the respective banks are joined together and a catalyst converter 11 is interposed in a joined portion and then communicated with a muffler 12 via an exhaust pipe 10.

A throttle valve 5*a* in linkage with an accelerator pedal is provided in the throttle chamber 5, and a bypass passage 13 is branched from the intake pipe 6 and extended in a bypassing relation to the throttle valve 5*a*. An Idle Speed Control (ISC) valve 14 is interposed in the bypass passage 13 for adjusting the amount of air flowing through the bypass passage 13 and controlling the idle rotational speed in the idle mode. Further, a fuel injector 15 is located in the intake manifold 3 at a position just upstream of the intake port 2*a* for each cylinder, and an spark plug 16 is attached to the cylinder head 2 for each cylinder such that a discharge electrode formed at a fore end of the spark plug 16 is exposed to a combustion chamber 1*c*. An igniter 18 is connected to an ignition coil 17 associated with the spark plug 16.

The fuel injector 15 is communicated with a fuel tank 20 through a fuel supply passage 19, and an in-tank type fuel pump 21 is provided in the fuel tank 20. The fuel pump 21 supplies fuel under pressure to the injectors 15 and a pressure regulator 23 through a fuel filter 22 interposed in the fuel supply passage 19. The pressure regulator 23 regulates the pressure of fuel supplied to the injectors 15 to be held at a predetermined level.

The pressure regulator 23 is constituted as a regulator of the known structure that an inner space is divided by a diaphragm provided with a pressure regulating valve into a fuel chamber to which the fuel supplied under pressure from the fuel pump 21 is introduced and a spring chamber in which a spring for biasing the pressure regulating valve in the closing direction is housed, and that the pressure in the intake pipe is introduced to the spring chamber through a passage communicating with the intake manifold 3. Surplus fuel is returned from the pressure regulating valve to the fuel tank 20. In that way, the fuel pressure is regulated to a constant preset level with respect to the pressure in the intake pipe downstream of the throttle valve 5*a,* i.e., the pressure of an injection atmosphere of the fuel injector 15.

At a top portion of the fuel tank 20, a fuel cut valve 24 is provided to prevent a fuel leakage if the vehicle should be fallen down, and to prevent fuel from flowing into an evaporating gas purge system that serves to purge a fuel evaporating gas generated in the fuel tank 20. A first purge passage 25 for introducing the evaporating gas purged through the fuel cut valve 24 is extended from the fuel cut valve 24 and then communicated with a top portion of a canister 26 that has an adsorption region formed using activated coal, for example. A fresh air introducing port is formed in a bottom portion of the canister 26 for communication with the atmosphere through an atmosphere opening valve 27 constituted as a solenoid on/off valve. A second purge passage 28 for introducing both fresh air from the fresh air introducing port and the evaporating gas built up in the adsorption region is extended from the top portion of the canister 26 and then communicated with the intake system (at a position just downstream of the throttle valve 5*a* in its fully closed state) through a canister purge control (CPC) valve 29 that serves to adjust the amount of purged evaporating gas.

Further, for recirculating exhaust gas from the exhaust system to the intake system of the engine 1, an Exhaust-Gas Recirculation (EGR) passage 30 is extended from the exhaust manifold 9 on the side of one bank and then communicated with the air chamber 4. An EGR valve 31 for adjusting an EGR rate is interposed midway the EGR passage 30 so that a part of the exhaust gas is recirculated to the intake system depending on the position (opening degree) of the EGR valve 31.

A description is now made of sensors for detecting the engine operating condition. At a position in the intake pipe 6 just downstream of the air cleaner 7, an intake-air amount and intake-air temperature measuring unit 50 is disposed which incorporates, as an integral unit, an air flow sensor 50*a* for measuring the amount of intake air and an intake air temperature sensor 50*b* for measuring the temperature of intake air. Also, a throttle sensor 51 incorporating a throttle position sensor 51*a* and an idle switch 51*b*, which is turned on upon the throttle valve 5*a* coming into a fully closed state, is associated with the throttle valve 5*a* disposed in the throttle chamber 5. An intake manifold pressure sensor 52 for detecting the pressure in the intake pipe at a position downstream of the throttle valve 5*a* is attached to the air chamber 4.

Further, a knock sensor 53 is attached to the cylinder block 1*a* of the engine 1, and an engine coolant temperature sensor 54 is located in a joining passage 39 communicating the left and right banks of the cylinder block 1*a* with each other. An EGR gas temperature sensor 55 for detecting the temperature of the EGR gas is located in the EGR passage 30. A front Air/Fuel (A/F) sensor 56 is disposed upstream of the catalyst converter 11, and a rear A/F sensor 57 is disposed downstream of the catalyst converter 11.

In addition, a crank angle sensor 59 is disposed to face an outer periphery of a crank rotor 58 mounted on the crankshaft 1*b* of the engine 1. A cam angle sensor 61 for determining which cylinder is currently in the combustion stroke, which cylinder is currently under fuel injection, and which cylinder is currently under ignition, is disposed to face a cam rotor 60 associated with a cam shaft 1*d* that is rotated ½ with respect to the crankshaft 1*b*. On the other hand, at the top portion of the fuel tank 20, a fuel tank pressure sensor 62 is disposed for detecting the pressure in the evaporating gas purge system. A fuel level sensor 63 for detecting the fuel level and a fuel temperature sensor 64 for detecting the fuel temperature are provided integrally with the fuel pump 21 in the fuel tank 20.

Figure 4:
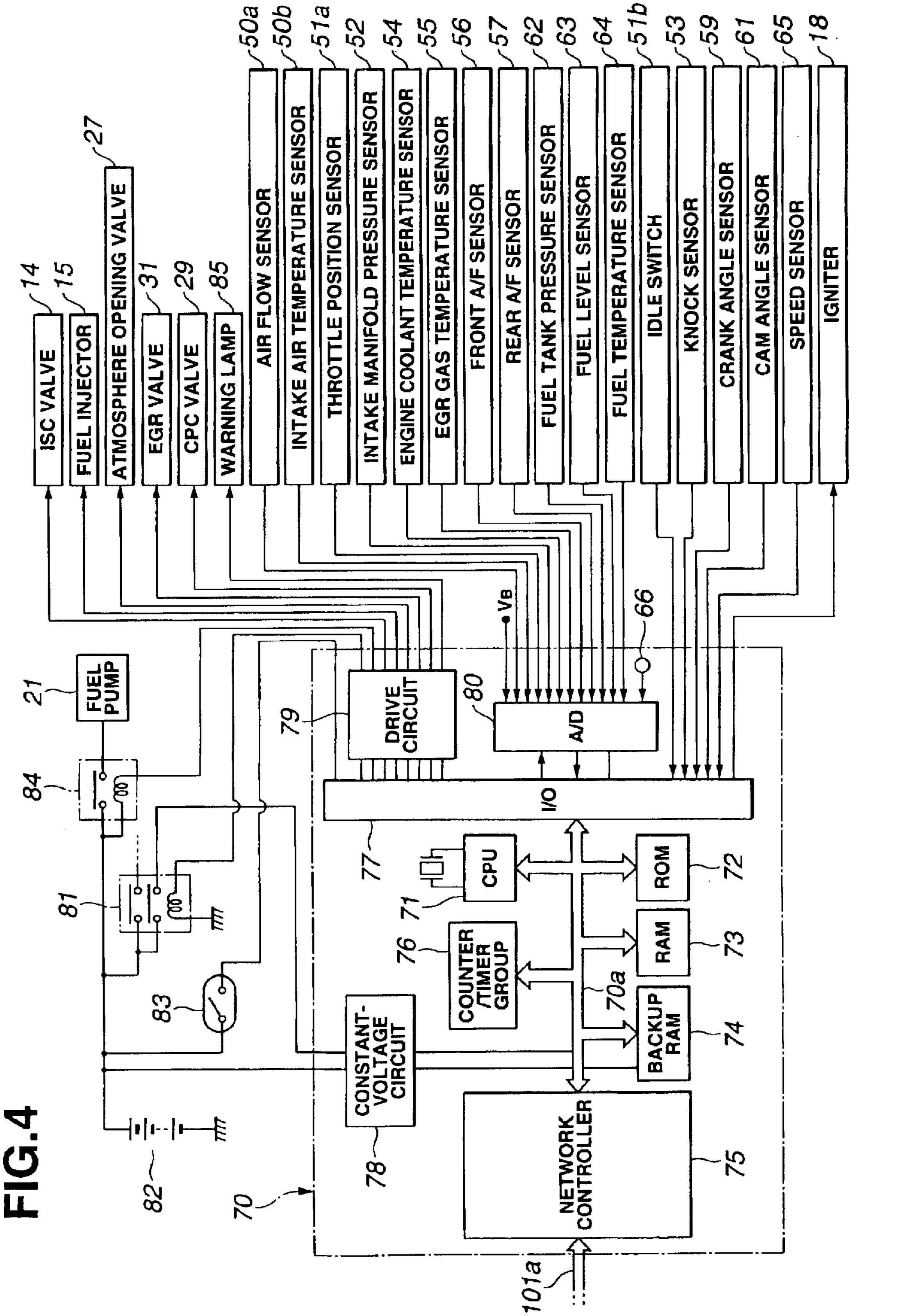
FIG. 4 is a circuit diagram of an engine electronic control system.

The above-described actuators and sensors provided in the engine system are connected to an engine control unit (ECU) 70 shown in FIG. 4. The ECU 70 corresponds to one, e.g., #02, of the control units #01, #02, #03, #04, #05, . . . constituting the network 101 of the vehicle 100, and is primarily constructed of a microcomputer. A CPU 71, a ROM 72, a RAM 73, a backup RAM 74, a network controller 75 for the on-board network, a counter/timer group 76, and an I/O (Input/Output) interface 77 are interconnected via an internal bus 70*a* and also connected from the network controller 75 to the other on-board control units via an external bus 101*a*.

The ROM 72 includes a mask ROM on which data is written with a photo mask in the manufacturing stage, and an EEP (Electrically Erasable Programmable) ROM on which data can be electrically rewritten; e.g., a flash ROM on which data can be erased at a time and rewritten with ease in an on-board state. The mask ROM stores a program for communication via the network controller 75, a program for writing programs, constants, etc. in the EEPROM via communication with an external device, and so on. The EEPROM does not store any significant data in the initial production stage. In the stage of assembling the ECU 70 in the vehicle, engine control programs for fuel injection control, ignition timing control, etc. and data depending on the model of the vehicle, such as control constants, are written on the EEPROM through the inspection tool 156*b* provided at the line end 156.

The counter/timer group 76 collectively implies various counters, such as a free run counter and a counter for receiving and counting a cylinder determining sensor signal (cylinder determining pulse), and various timers, such as a fuel injection timer, an ignition timer, a periodic interrupt timer for causing a periodic interrupt, a timer for measuring an input interval of a crank angle sensor signal (crank pulse), and a watchdog timer for monitoring a system abnormality. In addition to the above examples, various software counters and timers are also used.

The ECU 70 incorporates peripheral circuits, such as a constant-voltage circuit 78 for supplying stabilized power to the associated sections, and a drive circuit 79 and an A/D (Analog/Digital) converter 80 that are connected to the I/O interface 77. The constant-voltage circuit 78 is connected to a battery 82 through a first relay contact of a power supply relay 81 having two-circuit relay contacts, and is also directly connected to the battery 82. When an ignition switch 83 is turned on and the contact of the power supply relay 81 is closed, the power is supplied to the associated sections in the ECU 70. On the other hand, the backup power is supplied to the backup RAM 74 at all times regardless of whether the ignition switch 83 is turned on or off. Further, the fuel pump 21 is connected to the battery 82 through a relay contact of a fuel pump relay 84. In addition, a power supply line for supplying power to the various actuators from the battery 82 is connected to a second relay contact of the power supply relay 81.

The ignition switch 83, the idle switch 51*b*, the knock sensor 53, the crank angle sensor 59, the cam angle sensor 61, the speed sensor 65, etc. are connected to input ports of the I/O interface 77. Further, the air flow sensor 50*a*, the intake air temperature sensor 50*b*, the throttle position sensor 51*a*, the intake manifold pressure sensor 52, the engine coolant temperature sensor 54, the EGR gas temperature sensor 55, the front A/F sensor 56, the rear A/F sensor 57, the internal pressure sensor 62, the fuel level sensor 63, the fuel temperature sensor 64, an atmospheric pressure sensor 66 incorporated in the ECU 70, etc. are connected to other input terminals of the I/O interface 77 through the A/D converter 80. A battery voltage VB is also inputted to the I/O interface 77 for monitoring.

On the other hand, respective relay coils of the power supply relay 81 and the fuel pump relay 84, the ISC valve 14, the fuel injector 15, the atmosphere opening valve 27, the CPC valve 29, the EGR valve 31, a warning lamp 85 for notifying the occurrence of any abnormality, etc. are connected to output ports of the I/O interface 77 through the drive circuit 79. Further, the igniter 18 is connected to another output port of the I/O interface 77.

In the ECU 70, the CPU 71 executes the control program stored in the ROM 72 to process detection signals from the various sensors, the battery voltage VB, etc. inputted through the I/O interface 77. The fuel injection volume, the ignition timing, controlled variables of the actuators, etc. are computed based on various data stored in the RAM 73, various learned value data stored in the backup RAM 74, fixed data stored in the ROM 72, etc., thereby performing engine control such as Air/Fuel control (fuel injection control), ignition timing control, idle rotational speed control, evaporating gas purge control, EGR control, etc.

Simultaneously, the ECU 70 monitors with the self-diagnosing function whether there is no abnormality in the engine system including the engine 1 and the peripheral units. If any abnormality is detected, the warning lamp 85 is lit up or blinked, and trouble data is stored in the backup RAM 74. Further, the ECU 70 samples and computes various parameters indicating the vehicle travel condition during a period from start to stop of the engine operation. Then, the ECU 70 prepares frequency distributions of respective data and stores them in the backup RAM 74. The diagnosis information and the vehicle travel information stored in the backup RAM 74 are transmitted to the central information management center 151 as a part of the vehicle information of the vehicle 100 when the user transmits the vehicle information using the cellular phone 110, and are then accumulated in the database DB.

Figure 5:
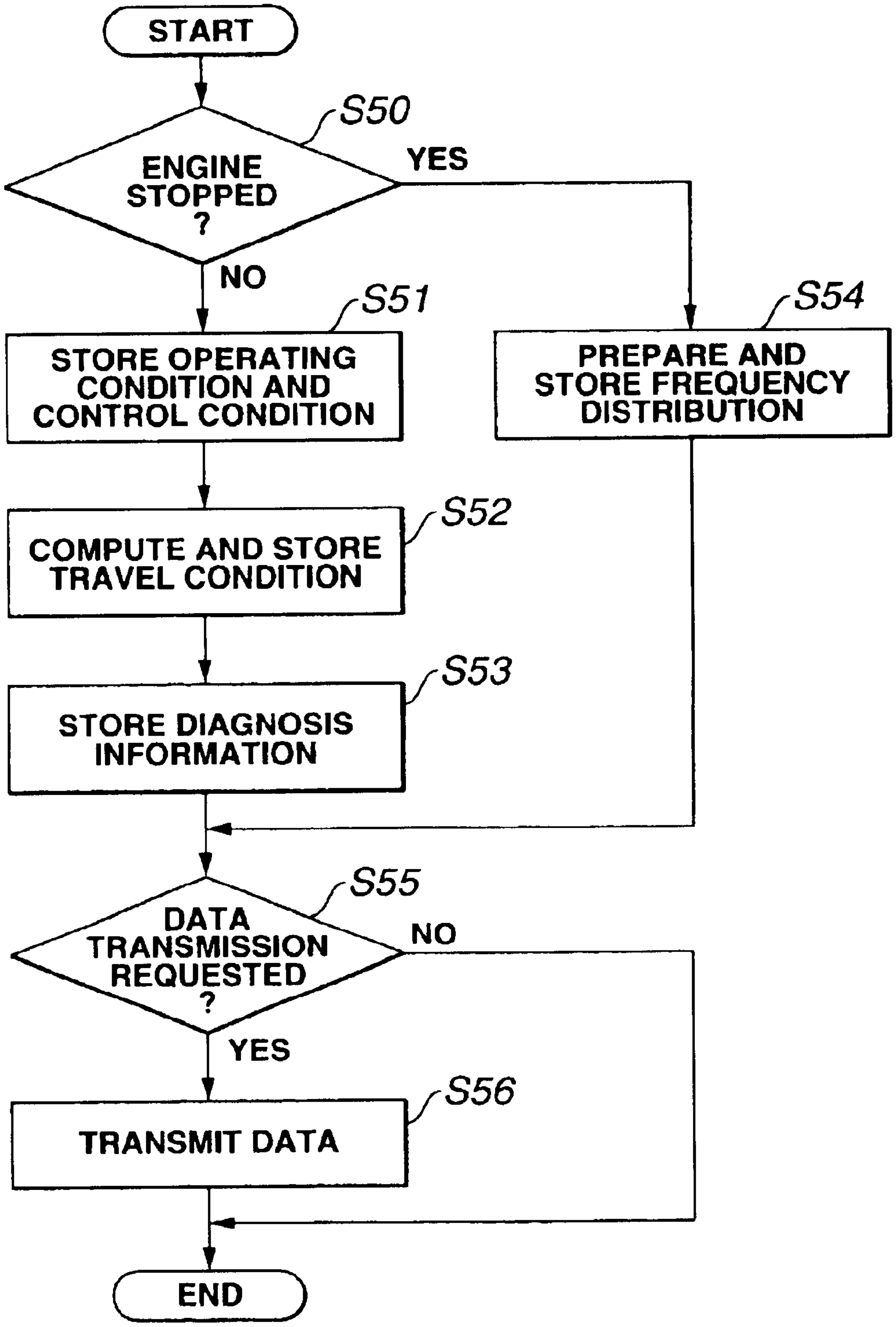
FIG. 5 is a flowchart showing an information processing routine on the vehicle side.

Information processing executed in the ECU 70 will be described below with reference to a flowchart of an information processing routine shown in FIG. 5.

In the information processing routine, the ECU 70 first checks in step S50 whether the engine is stopped. If the engine is under operation, the process flow goes to step S51 in which parameters indicating the operating condition, such as the engine rotational speed, the cooling water temperature, the vehicle speed, the throttle position (accelerator position in a vehicle provided with an electronic control throttle device), the intake air amount, the battery voltage, the atmospheric pressure, the fuel temperature and the fuel level, and parameters indicating the control condition, such as the fuel injection volume, the ignition timing, the evaporating gas purge amount and the control level in ISC, are written and stored in the backup RAM 74. Thereafter, the process flow goes to step S52.

In step S52, the ECU computes the time of engine complete explosion, maximum and minimum values of the atmospheric pressure, the driving time, the mileage (distance traveled), the mean specific fuel consumption, etc., and then writes and stores data of those computed values in the backup RAM 74 as the vehicle travel information including the operating condition parameters and the control condition parameters described above. Subsequently, the process flow goes to step S53 in which if any abnormality is detected by the self-diagnosis, the resulting diagnosis information is written and stored in the backup RAM 74.

Then, the process flow goes from step S53 to S55 in which it is checked whether there is a data transmission request upon the user's manipulation on the cellular phone 110 for transmitting the vehicle information. If there is no data transmission request, the ECU exits the routine. If there is a data transmission request, the process flow goes to step S56 in which the data in the backup RAM 74 is transmitted via the vehicle network 101. Thereafter, the ECU exits the routine. Note that the diagnosis information in the backup RAM 74 except for trouble data is cleared to secure a storage area for a next set of data after transmission to the central information management center 151.

Subsequently, when the engine is stopped, the process flow goes from step S50 to S54 in which the ECU prepares frequency distributions of respective data of the travel information recorded during the engine operation (or updates the frequency distributions when they are already present), and then writes and stores them in the backup RAM 74. Then, the process flow goes from step S54 to S55 in which it is checked whether there is a data transmission request. If there is a data transmission request, the ECU transmits the frequency distributions data in step S56 and exits the routine.

Figure 6:
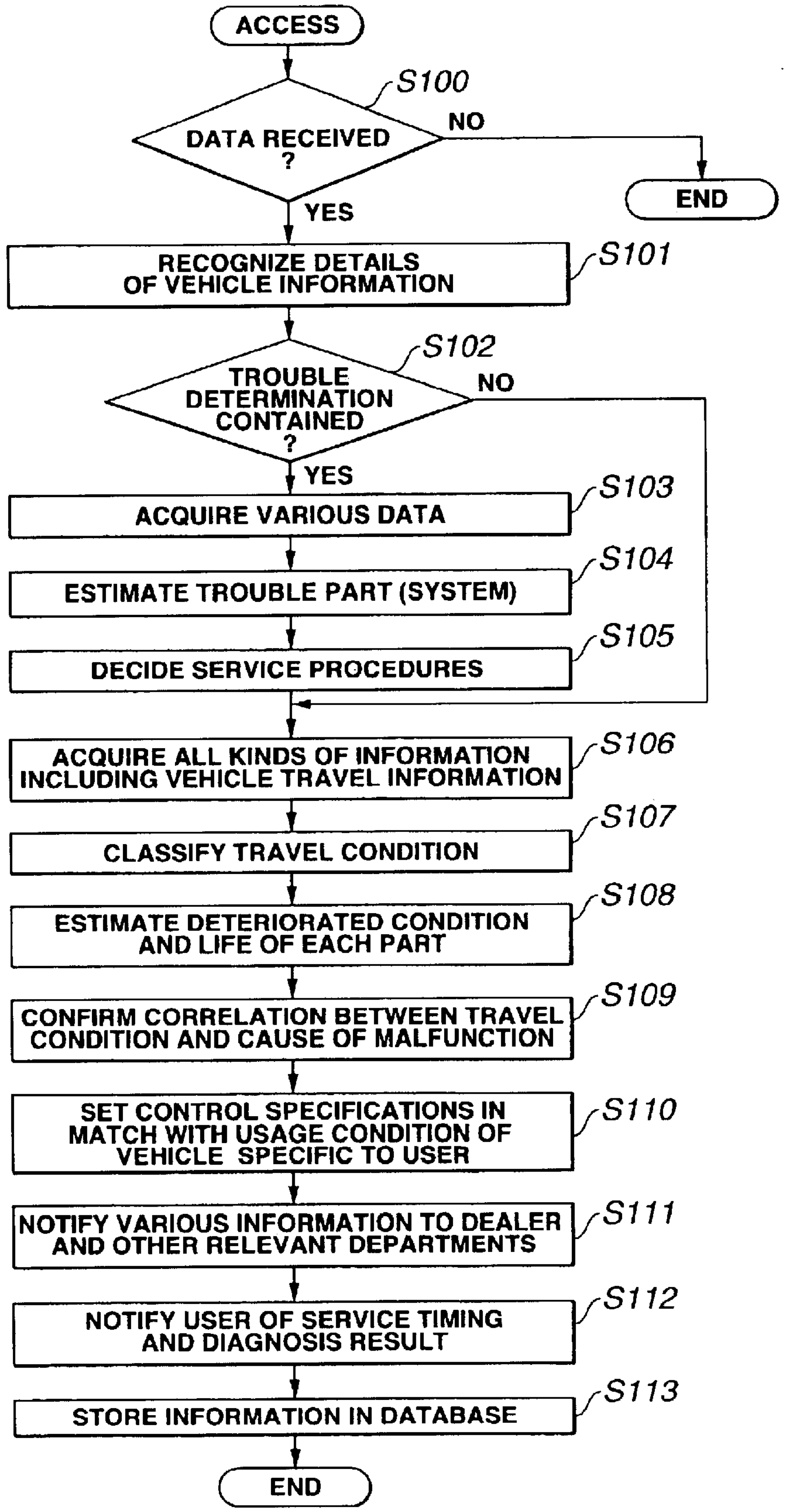
FIG. 6 is a flowchart showing an information processing routine on the side of central information management center.

On the other hand, the central information management center 151 executes information processing shown in FIG. 6 by the host computer 151*a*. In the information processing, the host computer 151*a* first checks in step S100 whether the vehicle information is received upon access from the user's cellular phone 110. If no data is received, the host computer exits the routine. If data is received, the process flow goes to step S101 in which the data type of the vehicle information and the corresponding system are identified based on the vehicle body number, the user identification code, the mileage (distance traveled), the date and time of data receipt, etc. Then, the host computer determines in step S102 whether a diagnosis determination result indicating the presence of trouble is contained in the vehicle information.

If the vehicle information does not contain the determination result indicating the presence of trouble and there is no noticeable abnormality, the process flow jumps from step S102 to S106. If the vehicle information contains the determination result indicating the presence of trouble, the process flow goes from step S102 to S103 in which the host computer acquires various data, such as the operating condition parameters, the control condition parameters and the diagnosis parameters corresponding to the occurrence of trouble. Then, the process flow goes to step S104 in which the acquired data is analyzed to estimate a trouble location, i.e., which system or part has a trouble. After deciding service procedures for repair and check in step S105, the host computer proceeds to step S106.

The host computer acquires all kinds of information including the vehicle travel information in step S106, and classifies the vehicle travel condition per district or country in step S107. Then, it estimates the deteriorated condition and remaining life of each part in step S108. More specifically, time-dependent changes in the system or the parts are confirmed based on changes in time-serially accumulated data of the on-board control units, e.g., changes in learned value data, input/output data under preset conditions, and computation data. The progress of deterioration in the system or the parts is estimated by comparing the vehicle initial information obtained by the line end inspection with the corresponding data transmitted from the user. From the estimated progress of deterioration, the remaining life of each part is estimated, and the part requiring service and the timing at which the service is to be made are computed.

The process flow then goes to step S109 in which the host computer analyzes the vehicle travel condition and confirms the correlation between the travel condition and the malfunction of the vehicle based on the analyzed result. For example, in the travel condition where the driving time and the distance traveled per driving-out on the road are in the relatively short ranges at high frequency and the cooling water temperature is the relatively low range at high frequency, i.e., in the travel condition where the vehicle runs just a short distance in most cases and repeats the start and the stop before reaching sufficient warm-up of the engine, it is possible to confirm the correlation between that travel condition and a trouble, such as a misfire due to carbon fouling of spark plug 16, deterioration in fuel economy due to oil dilution, and a malfunction due to carbon deposition on the EGR valve 31, or the correlation between that travel condition and a trouble that is expected to occur in near future.

In subsequent step S110, the ECU sets control specifications in match with the usage condition of the vehicle specific to each user based on the analyzed result of the vehicle travel condition, and rewrites the current control program and control constants depending on the desire of the user. For example, for the user who drives the vehicle in such a travel condition in most case that the engine rotational speed and the opening degree of the throttle are in the relatively high (large) ranges at low frequency and the mean specific fuel consumption is in the relatively small range at high frequency, i.e., that prime importance is placed on fuel economy, the control specifications can be modified to those ones in which the engine output performance is slightly reduced and the fuel economy is improved in comparison with the case employing the standard specifications. For the user who drives the vehicle in such a travel condition in most case that the engine rotational speed, the intake air amount and the opening degree of the throttle are in the relatively high (large) ranges at high frequency, i.e., that prime importance is placed on running performance, the control specifications can be modified to those ones in which the fuel consumption rate is slightly increased and the engine output performance is improved in comparison with the case employing the standard specifications. Further, for the user who drives the vehicle just a short distance in most case, the control specifications can be modified to those ones in which the smoldering resistance is intensified and the engine start time is shortened.

Subsequently, the process flow goes to step S111 in which various items of information, such as the vehicle information, notice information to the user, service procedures, and service parts (parts to be prepared), are notified to a dealer's service factory, for example, and the tendency of deterioration in parts per vehicle, the estimated results of part troubles, the time or mileage until the occurrence of trouble, the effect upon exhaust gas emissions, the vehicle travel condition, the modification details of the control specifications, etc. are fed back to the relevant departments. The process flow further goes to step S112 in which if there is a trouble portion to be repaired or checked or if there is a risk of the occurrence of trouble, the user is notified of the service timing and the correlation between the trouble and the vehicle travel condition, and is given with an advise for the optimum driving method as required. Then, in step S113, the above-mentioned relevant information is recorded in the database DB along with the history data for each vehicle based on the vehicle body number and the user identification code. A series of processing steps are thereby brought into an end.

As a result, the correlation between a malfunction and a travel condition of each vehicle can be confirmed, and an advance notice of the check timing can be given to the user prior to the actual occurrence of trouble. It is therefore possible not only to cut the cost and time required for repair, but also to enable a service factory to prepare the relevant parts in advance and to carry out the work schedule based on the distributed diagnosis information. Further, even when a trouble occurs due to the vehicle travel condition, it is possible not only to merely repair a trouble portion, but also to pursue the true cause of the trouble and advise the more appropriate driving method to the user.

Moreover, by confirming the vehicle travel condition per district or country and reflecting the confirmed information on development of vehicles to be next marketed, a vehicle having optimum specifications suitable for actual environments of use. Additionally, running environments desired for each user can be provided by modifying the specification to those ones in match with the driving conditions of individual users.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

According to the present invention, as described above, since vehicle travel conditions of individual users are confirmed, the cause of a malfunction or trouble in each vehicle can be pursued, and an advance notice of the check timing can be given to the user prior to the occurrence of trouble. By feeding the confirmed vehicle travel conditions back to the relevant departments, optimum specifications in match with actual individual environments of use can be realized.

What is claimed is:

1. A vehicle management system for controlling various operating conditions of a plurality of control means of an individually owned vehicle having a network electronically connected to said vehicle via a central information management center for communicating data of said various operating conditions with one of a user and related departments and for storing said data in a database thereof, comprising:

transmitting means included in said vehicle for storing said data and for transmitting said data to said database;

precessing means for individually analyzing said operating conditions on the basis of said data stored in said database and for preparing an analyzed data signal;

sorting means for grouping said data in appropriate categories of said various operating conditions so as to analyze thereof and store analyzed data;

estimating means for predicting a cause of bad conditions and a durability of each component mounted on said vehicle by comparing said analyzed data with standard values of said various operating conditions individually decided by said user;

renovating means for changing said standard values to individually and adequately set values in accordance with historical data of said various operating conditions and for generating a set value signal; and distributing means for transmitting said set value signal to one of said respective related departments, wherein said distributing means comprises a data accessibility right for said departments for detecting a real cause of an abnormality or said bad conditions of said vehicle due to said historical data of said operating conditions by said user.

2. The vehicle management system according to claim 1, further comprising:

a control unit mounted in the vehicle, wherein control specifications of the control unit are changed to match with a usage condition of the vehicle specific to each user based on the analyzed result of the travel condition.

3. The vehicle management system according to claim 1, wherein said transmitting means transmits data from a control unit mounted in the vehicle in real time via wireless communication, and wherein travel information transmitted from said data transmitting means is received and accumulated in said database.

4. The vehicle management system according to claim 1, wherein said processing means analyzes the vehicle travel conditions and confirms a correlation between the operating conditions and a malfunction of the vehicle based on an analyzed result.

5. The vehicle management system according to claim 1, further comprising:

a control unit for preparing statistical frequency distribution analyses of the operating data recorded during engine operation.

6. The vehicle management system according to claim 5, wherein said control unit rewrites a control program depending on a usage condition of the vehicle.

7. The vehicle management system according to claim 5, wherein the processing means analyzes vehicle operating conditions and confirms a correlation between the operating conditions and a malfunction of the vehicle based on an analyzed result.

8. The vehicle management system according to claim 5, wherein the control unit prepares a statistical frequency distribution analysis of the operating conditions and records said analysis to said database.

9. A vehicle management method for controlling various operating conditions of a plurality of control means of an individually owned vehicle having a network electronically connected to said vehicle via a central information management center for communicating data of said various operating conditions with a user and related departments and for storing said data in a database thereof, the method comprising:

analyzing statistically said operating conditions stored in said database;

transmitting said analyzed operating conditions to said database;

individually analyzing said analyzed operating conditions on the basis of said operating conditions and said statistically analyzed operating conditions stored in said database;

sorting said analyzed operating conditions for grouping thereof in appropriate categories of said various operating conditions so as to analyze thereof and to store said analyzed data;

predicting a cause of bad conditions and a durability of each component mounted on said vehicle by comparing said analyzed data with standard values of said various operating conditions individually decided by said user;

renovating said standard values to individually and adequately set values in accordance with historical data of said various operating conditions; and distributing said set value to one of said respective related departments in said network with a data accessibility right for said departments so as to detect a real cause of an abnormality or said bad conditions of said vehicle due to said historical data of said operating conditions by said user.

10. The vehicle management method of claim 9, further comprising:

preparing frequency distribution data based on the data obtained during an operational period from start to stop of an engine.

11. The vehicle management method of claim 9, further comprising:

controlling the specifications of a vehicle control unit to match with an operational condition of the vehicle specific to each user based on an analyzed result of the operating condition.

12. The vehicle management system according to claim 9, wherein said transmitting comprises transmitting data of a control unit mounted in the vehicle in real time via wireless communication, and receiving said data into said database.

13. The vehicle management system of claim 9, wherein said analyzing statistically said operating conditions analyzes the vehicle operating conditions and confirms a correlation between the operating conditions and a malfunction of the vehicle based on an analyzed result.

14. The vehicle management system of claim 9, wherein said distributing performs real time distribution of data analyzed for abnormalities and malfunctions of the vehicle during operation of the vehicle.

* * * * *